E. F. MILLS.
PRESSURE CONTROLLER OR INSTRUMENT.
APPLICATION FILED DEC. 4, 1916.
1,430,098.
Patented Sept. 26, 1922.
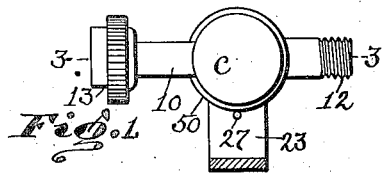
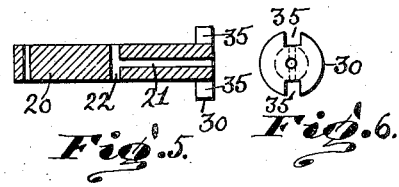
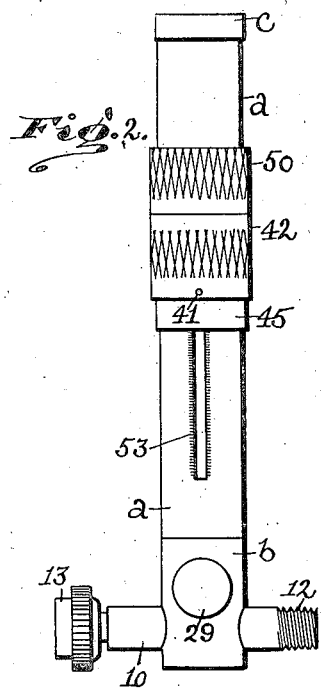
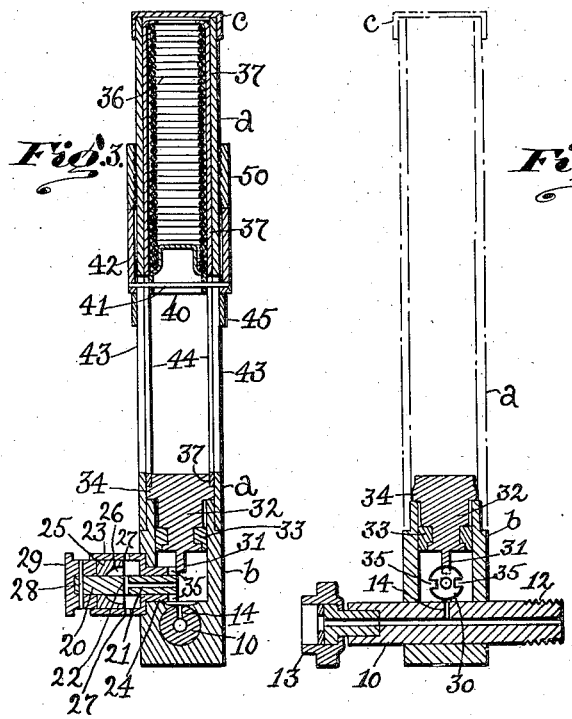
Inventor
Edward Frank Mills
by Jas. H. Churchill
Atty.

Patented Sept. 26, 1922.

1,430,098

UNITED STATES PATENT OFFICE.

EDWARD FRANK MILLS, OF SALEM, MASSACHUSETTS, ASSIGNOR TO A. SCHRADER'S SON, INC., OF BROOKLYN, NEW YORK, A CORPORATION OF NEW YORK.

PRESSURE CONTROLLER OR INSTRUMENT.

Original application filed February 24, 1916, Serial No. 80,277. Divided and this application filed December 4, 1916. Serial No. 134,834.

*To all whom it may concern:*

Be it known that I, EDWARD FRANK MILLS, a citizen of the United States, and a resident of Salem, in the county of Essex and State of Massachusetts, have invented an Improvement in Pressure Controllers or Instruments, of which the following description, in connection with the accompanying drawings, is a specification, like characters on the drawings representing like parts.

This invention relates to a pressure gage or instrument with which the transmission of fluid pressure from a suitable source of supply to a receptacle, may be automatically interrupted when the pressure in said receptacle reaches a predetermined point or amount.

Provision is made for varying the amount of fluid pressure at which the gage operates to interrupt the flow of fluid pressure to said receptacle.

The invention is especially applicable among other uses to be employed in connection with pneumatic tires of automobiles, whereby the latter are prevented from being excessively inflated.

The preferred form of the pressure gage is herein shown and is provided with a relief valve of novel construction as will be described, which is locked both in its closed and opened positions by a piston actuated by a tension spring, which latter is operatively connected at one end to said piston to be elongated by a push upon the spring by fluid pressure acting against said piston, and has its other end operatively connected to a device on the exterior of the instrument, which is preferably capable of being adjusted to vary the pressure at which the flow of fluid pressure is interrupted.

These and other features of this invention will be pointed out in the claims at the end of this specification.

Fig. 1 is a plan view of an instrument embodying this invention.

Fig. 2, an elevation of the instrument shown in Fig. 1.

Fig. 3, a longitudinal section on the line 3—3, Fig. 1, with the relief valve in its open position.

Fig. 4, a view in elevation and section with the relief valve in its closed and locked position, and Figs. 5 and 6, details of the relief valve stem on an enlarged scale.

In the present instance, I have shown one embodiment of the invention, in which a cylindrical casing $a$ is provided at one end with a removable cylinder $b$ and at its other end with a cap $c$. The cylinder $b$ has extended through it transversely a pipe 10, which projects beyond the said cylinder at both ends, and one end as 12 is designed to be connected with a source of fluid under pressure, and the other as 13 is designed to be connected with the tire or other receptacle to be filled with fluid under pressure. The pipe 10 is provided with a port 14 which connects the pipe with the interior of the cylinder $b$, so that the latter is supplied with fluid under pressure.

The cylinder $b$ is provided with a relief valve of novel construction, which is normally closed as long as the pressure in the cylinder $b$, which is the same as that in the tire or other receptacle, per square inch, remains below a predetermined amount, but which is automatically opened when the fluid pressure reaches the predetermined amount.

The relief valve is preferably made as herein shown and consists of a stem or rod 20, provided with a longitudinal passage or port 21, extended from the inner end of said stem or rod toward the longitudinal center thereof, where it communicates with a transverse port or passage 22 (see Figs. 3 and 5), which communicates with a cylindrical casing 23 of larger diameter than said stem or rod, and provided with an extension 24, whose internal diameter is substantially the same as that of the said stem or rod. The extension 24 forms a bearing in which the valve stem or rod 20 slides. The valve stem or rod 20 has mounted on it a piston valve 25, preferably of leather or other flexible or yielding material, which is provided at its front end with a recess or cavity 26, to provide the front end of the valve with a circumferential wall of reduced thickness, which is capable of being firmly pressed outwardly into contact with the cylinder 23 by the pressure in the cavity or recess 26, thereby ensuring a fluid-tight contact of the valve with its casing or cylinder 23, and consequently ensuring closure of the outlet port or ports 27 in the casing or cylinder when the relief valve is closed.

The valve stem or rod 20 is made longer than its cylinder 23, and its outer end is extended beyond its cylinder and has fastened to it, as by the pin 28, a head 29, by means of which the relief valve may be readily moved into its closed position by hand.

The head 29 is made long enough to extend into the valve casing or cylinder 23 and its inner end is of substantially the same diameter as the casing, so that when the relief valve is in its open position, its rod or stem 20 is supported at its opposite ends in bearings, namely, at its front end by the valve casing 23 and at its rear end by the extension 24 of said casing. As a result, liability of the valve stem being bent or distorted so as to render it difficult to open and close the valve, and thereby render the instrument inoperative or at least inaccurate is avoided.

Provision is made for locking the relief valve in its closed and opened positions.

To this end, the valve stem 20 is provided on its inner end with a collar or annular flange 30, (see Figs. 5 and 6), which has co-operating with it a stud or projection 31, extended from the lower face of a piston 32, which has its lower portion movable in the cylinder $b$ and has its upper portion movable in the casing $a$.

The lower end of the piston 32 is rendered air-tight in the cylinder $b$ by means of a suitable packing 33, (see Fig. 3) and the upper portion of the piston, which is movable in the casing $a$ is made of larger diameter than the cylinder $b$ so as to form a head 34, which co-operates with the end of the cylinder $b$, to limit the movement of the piston 32 toward the relief valve, and thereby prevent the projection 31 from engaging the stem of the relief valve when the latter is in its closed position, and consequently preventing pressure being applied to the inner end of the valve stem and bending or cramping the same, so as to distort it and render it difficult to move either by pressure or by hand. The stud or projection 31 co-operates with the flange or collar 30 to form a locking device for the relief valve, and the flange or collar is provided with one or more slots 35, with relation to which the projection 31 is made of such width as to readily pass through the same when the slot is in alignment with said projection.

In the present instance, the flange or collar 30 is provided with two slots 35, which are arranged substantially diametrically opposite, and one of which is used when it is desired to close the relief valve by hand.

The slot 35 permits the collar or flange 30 to be moved from one side of the projection 31 to the other side thereof, when the latter is in its operative position, into which it is moved by a tension spring 36, as soon as the pressure in the cylinder $b$ falls below the predetermined amount.

The tension spring 36 is located within a tube 37, which is attached to the piston 32 and forms a hollow piston rod, said spring being suitably fastened to the upper or outer end of the piston rod and having its lower or inner end fastened to a cup or head 40, which is connected by a pin 41 with a sleeve 42, mounted to slide on the outside of the cylinder or casing $a$.

The sleeve 42 is permitted to be moved longitudinally on the casing $a$, by providing the latter and the hollow piston rod 37 with longitudinally extended substantially diametrically opposite slots 43, 44, through which the opposite ends of the pin are extended and in which said pin moves and is guided thereby.

The sliding sleeve 42 has co-operating with it a small sleeve or collar 45, which is movable with the sleeve 42 in one direction and remains in the position into which it is moved by the sleeve 42, until the collar 45 is moved in the opposite direction by hand. The collar 45 constitutes one form of indicator, as will be described. The sleeve 42 is normally held by the contraction of the spring 36 against a stop in the form of a sleeve or collar 50, which is in threaded engagement with the casing or cylinder $a$ and is adjustable thereon.

The indicator 45 co-operates with graduations 53 on the outside of the casing $a$ to indicate the pressure at which it is desired the relief valve should open.

When it is desired to predetermine the pressure pumped or otherwise supplied to a tire or other receptacle, the relief valve 25 is moved by hand into its closed position by turning the valve stem 20 until one of the slots 35 registers with the projection 31, and then pushing the valve 25 in its cylinder 23 until the ports 27 are closed, at which time the collar 30 is moved beyond the projection 31, after which the valve is given a quarter turn, so as to bring a solid part of the collar in position to engage the projection 31, and thereby lock the relief valve in its closed position. This relation of the collar 30 to the projection 31 is shown in Fig. 4.

The pressure at which the relief valve may be opened, is controlled by means of the threaded sleeve or collar 50, which can be turned on the casing so as to place the spring 36 under the tension desired or required, in order to obtain in the tire or other receptacle the desired or predetermined amount of pressure.

Let it be assumed that the gage is set to interrupt the flow of fluid pressure from the supply to the tire, when the pressure in the latter reaches eighty pounds. In this case, the sleeve 50 is rotated until the indicator 45 reaches the graduation marked 80 on the casing, which action places the spring under such tension as to require a pressure of eighty pounds in the cylinder $b$ to move the piston 32 sufficiently to carry the projection 31 clear of the collar 30 and thus unlock the relief valve 25, which is instantly moved by the fluid pressure to spill into the atmosphere, thereby preventing the pressure from rising in the tire above the predetermined amount.

The pressure exerted upon the piston 32 causes the hollow piston rod 37 to move the free or upper end of the spring 36, the lower end being anchored by the sleeve 50 through the sleeve 42, pin 41, and head 40.

The supply of pressure to the tire is now manually cut off at the source, if the operator is attending to his business, and if he is not or is otherwise engaged, over inflation of the tire cannot take place, as the relief valve remains open until manually closed.

After the instrument has been disconnected from the tire, the relief valve is moved by the operator into its cylinder until the head 29 of the valve stem 20 engages the end of the cylinder $b$, at which time the ports 27 are closed by the valve 25, and the collar 30 has been moved to the other side of the projection 31, which has been moved into its operative or starting position by the spring 36 as soon as the fluid pressure acting on the piston falls below the predetermined amount. The valve stem 20 is then turned, preferably about a quarter turn to bring a solid portion of the collar 30 in line with the projection 31, as shown in Fig. 4, and the relief valve is thus locked in its closed position.

It will be observed that the tension of the spring 36 within the casing is regulated by means on the exterior of the casing, which means serves to anchor one end of the spring and render the spring responsive to fluid pressure admitted into the casing to move the unanchored end with respect to the anchored end.

The present application is a division of my application Serial No. 80,277 filed February 24, 1916.

Claims.

1. In a device of the character described, in combination, a casing, a relief valve, a piston normally locking said relief valve in its closed position and responsive to a predetermined pressure to unlock said relief valve, a spring in said casing having one end connected with said piston, and an abutment device on the outside of said casing, the other end of said spring being connected to said outside abutment device through the body of the casing.

2. In a device of the character described, in combination, a casing, a relief valve, a piston normally locking said relief valve in its closed position, a piston rod for said piston extended within said casing, a spring within said casing connected at one end with said piston rod, a sleeve slidable upon said casing, means for connecting the other end of said spring with said sleeve, and a device on said casing co-operating with said sleeve to form an abutment therefor.

3. In a device of the character described, in combination, a cylinder having a fluid inlet, a relief valve for said cylinder having a cylindrical casing provided with an extension of smaller diameter supported by said piston cylinder and having an outlet port external to said piston cylinder, a valve stem extended through said extension into said piston cylinder, provided with a collar having a slot, and having a port for the passage of fluid from the piston cylinder into the casing of said relief valve, a projection on said piston co-operating with the slotted collar on said valve stem, and means to move the said piston toward said valve stem.

4. In a device of the character described, in combination, a cylinder provided with a fluid inlet, a relief valve communicating with said cylinder and having its stem extended therein and provided with a locking member, a piston in said cylinder provided with a locking member which co-operates with the locking member on the valve stem, means to move said piston in its cylinder to normally lock the relief valve in its closed position, and means to limit the movement of said piston toward said valve stem to such an extent that the locking member thereon does not bear on said valve stem in the closed position of the latter.

5. In a device of the character described, in combination, a cylinder provided with a fluid inlet, a cylindrical casing extended laterally from said cylinder and provided with an extension of smaller diameter which is supported by said cylinder, and having an outlet port between its ends, a valve stem supported by said extension and provided with a head supported by said casing, a cup-shaped valve of yielding material mounted on said stem and co-operating with said outlet port to normally close the same, and a piston in said cylinder co-operating with said valve stem to lock the relief valve in its closed position.

6. In a device of the character described, in combination, a casing, extensible resilient means, one end of which is responsive to fluid pressure admitted into said casing, and means located outside of said casing and connected through the casing with the opposite end of said extensible device, the yielding of said means under the effect of the fluid pressure being accompanied by an extension of said means.

7. In a device of the character described, in combination, a casing, an extensible resilient device located in said casing, means connected with one end of said extensible device and acted upon by fluid pressure admitted into said casing, and means located outside of said casing and connected through the casing with the opposite end of said extensible device to anchor the same, the unanchored end when moved by fluid pressure greater than the resilient force of said spring, extending said extensible device.

8. In a device of the character described, in combination, a casing, an extension spring located in said casing, a piston in said casing responsive to fluid pressure admitted therein and operatively connected with said spring, and means located outside of said casing and connected through said casing with said spring to anchor the latter at one point and cause the spring to extend with respect to the anchored position by fluid pressure admitted into the casing and acting on said piston.

9. In a device of the character described, in combination, a casing, a resilient extensible member located in said casing, and means on the outside of said casing connected through said casing with said extensible member within the casing to anchor said member at one point and render fluid pressure admitted into the casing effective to extend another portion of said member with respect to the anchored portion.

10. In a device of the character described, in combination, a casing, a relief valve for said casing, a device for automatically locking said relief valve in its open position following the operation of said relief valve.

11. In a device of the character described, the combination of a casing, a spring therein, and means at the exterior of the casing for anchoring said spring, a part adapted to have fluid under pressure act thereon and the movement of which, under the pressure of fluid, is opposed by said spring, said spring being connected to said part at its end which is remote from the pressure end of the casing, and being connected to said anchoring means through said casing at its end which is proximate said pressure end.

12. In a device of the character described, the combination of a casing, a spring therein, and means at the exterior of the casing for anchoring said spring, a part adapted to have fluid under pressure act thereon and the movement of which, under the pressure of fluid, is opposed by said spring, a sleeve connected to said pressure part and extending the length of said spring, said spring being connected at one end to the remote end of said sleeve, said spring being connected to said anchoring means at its end which is proximate said pressure end.

13. In a device of the character described, the combination of a casing, a spring therein, and means at the exterior of the casing for anchoring said spring, a part adapted to have fluid under pressure act thereon, and the movement of which, under the pressure of fluid, is opposed by said spring, said spring being connected to said part at its end which is remote from the pressure end of the casing, and being connected to said anchoring means at its end which is proximate said pressure end, and means adjusting the position of said anchoring means whereby the tension of said spring may be adjusted.

14. A pressure transmitting controller, comprising a head and a stem having communicating passages, said stem having a relief outlet, a valve for closing the outlet, a casing, a lock movable relative to the casing for controlling the valve, a sleeve connected to the lock for movement therewith, a spring having one end secured to the casing and its other end secured to the sleeve, and means for expanding the spring when the air pressure has reached a predetermined amount to permit the lock to release the valve.

15. A pressure transmitting controller, comprising, in combination, a head having an air conduit, a stem having an air conduit communicating with the conduit in the head, and having a relief opening, a valve for said opening, a valve lock, a spring normally acting by contractile force to hold the lock in locking position, and means acting to expand the spring to permit the lock to move to unlocking position under predetermined air pressure.

In testimony whereof, I have signed my name to this specification.

EDWARD FRANK MILLS.